United States Patent [19]
Connell et al.

[11] Patent Number: 6,134,130
[45] Date of Patent: Oct. 17, 2000

[54] POWER RECEPTION CIRCUITS FOR A DEVICE RECEIVING AN AC POWER SIGNAL

[75] Inventors: Lawrence Edwin Connell, Naperville; Patrick Lee Rakers, Kildeer; Timothy James Collins, Lockport; Donald Bernard Lemersal, Jr., Park Ridge, all of Ill.

[73] Assignee: Motorola, Inc., Schaumburg, Ill.

[21] Appl. No.: 09/356,427

[22] Filed: Jul. 19, 1999

[51] Int. Cl.[7] .............................. H02M 5/42; H02M 7/00
[52] U.S. Cl. ................................ 363/89; 363/70
[58] Field of Search .................. 363/69, 70, 84, 363/81, 89, 125, 127

[56] References Cited

U.S. PATENT DOCUMENTS

| | | | |
|---|---|---|---|
| 3,882,372 | 5/1975 | Martynow | 323/226 |
| 4,103,219 | 7/1978 | Wheatley, Jr. | 323/226 |
| 4,857,893 | 8/1989 | Carroll | 340/572 |
| 5,045,770 | 9/1991 | Brooks | 323/223 |
| 5,229,708 | 7/1993 | Doing et al. | 323/223 |
| 5,267,137 | 11/1993 | Goebel | 363/69 |
| 5,308,968 | 5/1994 | Yamaguchi | 235/492 |
| 5,326,965 | 7/1994 | Inoue | 235/492 |
| 5,398,182 | 3/1995 | Crosby | 363/89 |
| 5,453,713 | 9/1995 | Partovi et al. | 327/565 |
| 5,530,403 | 6/1996 | Bushman et al. | 330/253 |
| 5,563,779 | 10/1996 | Cave et al. | 363/59 |
| 5,652,423 | 7/1997 | Saitoh | 235/492 |
| 5,694,074 | 12/1997 | Kitade et al. | 327/390 |
| 5,801,372 | 9/1998 | Yamaguchi | 235/492 |
| 5,804,811 | 9/1998 | Saitoh et al. | 235/492 |
| 5,953,223 | 9/1999 | Kato et al. | 363/69 |

*Primary Examiner*—Peter S. Wong
*Assistant Examiner*—Bao Q. Vu
*Attorney, Agent, or Firm*—Steven R. Santema

[57] ABSTRACT

Power reception circuits employable in portable data devices (e.g., smart cards) to derive power and/or data from an input AC power signal (e.g., an ASK modulated carrier signal). In one embodiment, the power reception circuit comprises a power rectifier (120), a shunt rectifier (142) and a shunting element (132). The power rectifier (120) is adapted to rectify the input power signal, yielding a rectified output waveform. The shunt rectifier (142) is connected in parallel with the power rectifier (120). The shunting element (132) is connected to the shunt rectifier (142) and is operable to regulate an output voltage or current waveform produced at the output of the power rectifier (120). In another embodiment, the power reception circuit includes an analog circuit (610) for recovering data from a modulated carrier signal. A decoupling device (630) isolates the analog circuit (610) from impedance variations of a load. A shunt device (640) diverts undesired current from the load.

21 Claims, 5 Drawing Sheets

120

FULLWAVE BRIDGE RECTIFIER

142

SHUNT RECTIFIER

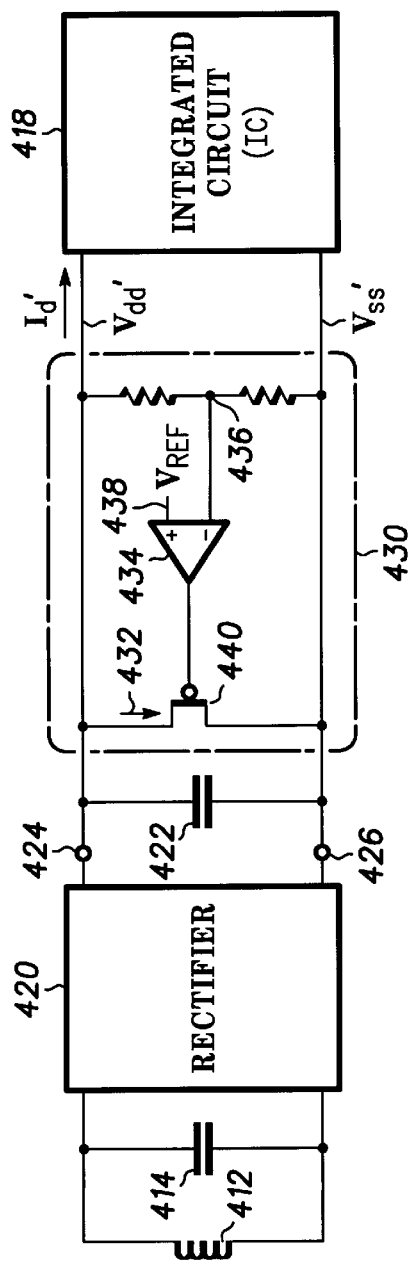
FIG. 4 — PRIOR ART —
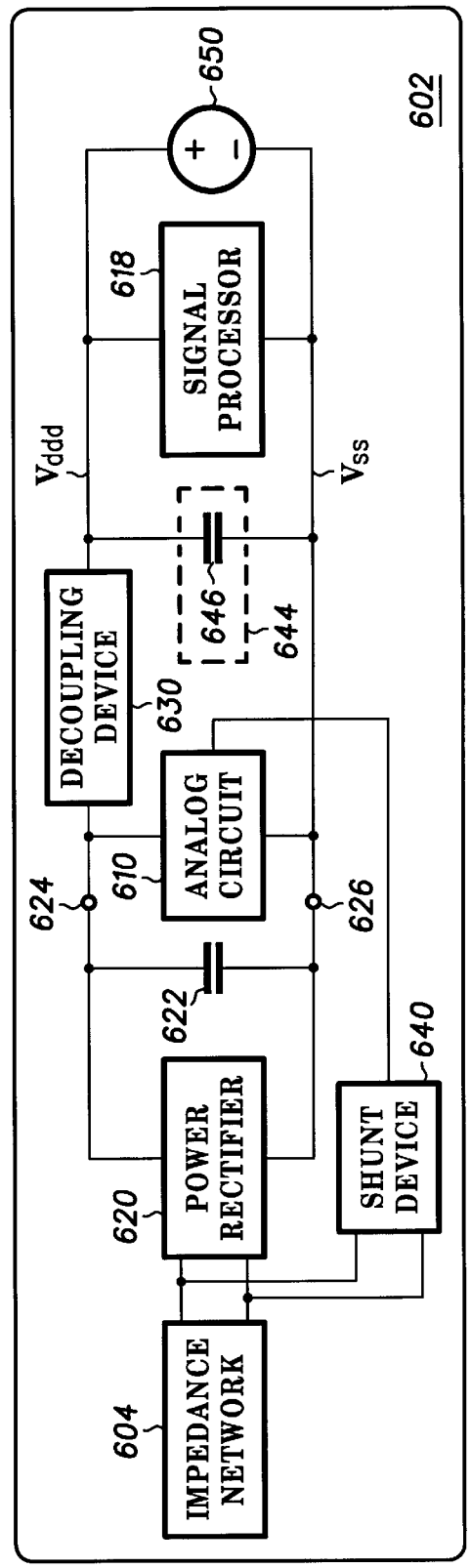
FIG. 6

POWER RECEPTION CIRCUITS FOR A DEVICE RECEIVING AN AC POWER SIGNAL

FIELD OF THE INVENTION

This invention relates generally to power regulation, and more particularly to power regulation in devices receiving an AC power signal, such devices including but not limited to portable data devices, or "smart cards."

BACKGROUND OF THE INVENTION

Smart cards, sometimes referred to as IC cards or RFID cards, are a form of portable data device generally having a plastic substrate with a semiconductor "chip" (i.e., integrated circuit (IC)) disposed therein. The semiconductor chip usually includes memory and processor components for processing digital data such as, for example, program instructions supporting debit/credit transactions, user information, and the like. It is well understood that components of the smart card require connection to a source of operating power, usually DC power, at a level that does not exceed the power capacity of the components and thereby damage the components. Most advantageously, the power is supplied externally from the card so that the card does not require a battery that would increase the thickness of the card. To that end, some smart cards include antenna elements (e.g., one or more inductive coils) for coupling to radiated field(s) produced by devices such as card readers, or data communications terminals. The fields to which the cards are coupled may comprise, for example, radio frequency (RF) power signals modulated with 10% amplitude shift keying (ASK). The smart card can thereby derive power from and detect data from the AC power signals.

The above-described cards are known as "contactless" cards because they can couple to the radiated fields without physically contacting the terminal device, for example by a user simply waving the card within a predetermined range of the terminal device. Also known are "contacted" cards that require a physical connection to a terminal device. Additionally, smart cards exist that are operational in either a contacted mode or a contactless mode. Such cards are equipped with RF receiving circuitry (for contactless operations) and contact elements (for contacted operations) and are commonly referred to as dual mode smart cards.

One problem that exists primarily in the contactless mode of operation stems from the card coupling to fields that vary in intensity at different points in space, causing the card to receive variable amounts of electrical power. For example, a card placed directly adjacent the terminal device can receive an order of magnitude greater power than a card placed at the outer limit of the predetermined range. To compensate for such wide input power variations in contactless cards, it is known to employ a power reception circuit including a shunting device ("shunt regulator") to attempt to regulate the voltage across the antenna coil and prevent damage to the smart card components due to overvoltage.

For example, one known type of power reception circuit includes a shunt regulator placed across the output terminals of a rectifier circuit (e.g., a bridge rectifier) in parallel with a power supply bypass capacitor, the aim of the power reception circuit being to restrict the power supply voltage and current to desired levels. However, a problem with the prior art power reception circuit is that it can produce wide fluctuations in output power (commonly known as power supply ripple), due to capacitor discharge when the rectifying bridge is not conducting. Generally, the amount of power supply ripple is directly proportional to the amount of current drawn through the shunt regulator. Although power supply ripple can be limited by the use of very large bypass capacitors in parallel with the shunt regulator, the use of such large capacitors is undesirable because it can drive up the cost and/or increase the size of the smart card.

Yet another problem associated with contactless smart card operation is that of energy fluctuations caused by the smart card IC. In particular, these energy fluctuations, which can be caused by switching noise or current spikes associated with the IC circuitry, can interfere with the smart card's ability to recover data from the modulated power signal (e.g., modulated with 10% amplitude shift keying (ASK)). If the switching noise is allowed to couple to the ASK modulated power signal, the data signal may become corrupted. Thus, the problem of switching noise must be addressed in order to improve performance during contactless operations.

Accordingly, there is a need for circuitry employable in a device such as a contactless smart card that derives, from an input power signal (e.g., a modulated RF carrier signal), an output power signal suitable for driving processing components of the device. Preferably, the output power signal does not exhibit excessive power supply ripple. There is further a need for a circuitry employable in a device such as a contactless smart card that prevents device circuitry switching noise that otherwise would compromise the ability of the card to receive ASK modulated data from coupling to the modulated power signal. The present invention is directed to satisfying or at least partially satisfying the aforementioned needs.

BRIEF DESCRIPTION OF THE DRAWINGS

The foregoing and other advantages of the invention will become apparent upon reading the following detailed description and upon reference to the drawings in which:

FIG. 4 is a circuit diagram of a prior art power reception circuit;

FIG. 6 is a block diagram of a smart card employing a two shunting elements in accordance with one embodiment of the present invention;

DESCRIPTION OF PREFERRED EMBODIMENTS

The following describes power reception circuits employable in portable data devices (e.g., smart cards) to derive power and/or data from an input AC power signal (e.g., an ASK modulated carrier signal).

In one embodiment of the present invention, the power reception circuit comprises a lower rectifier, a shunt rectifier and a shunting element. The power rectifier is operably coupled to an AC input power signal and includes a first pair of output terminals. The power rectifier is adapted to rectify the input power signal, yielding a rectified output waveform across the first pair of output terminals. The shunt rectifier is connected in parallel with the power rectifier and includes a second pair of output terminals, and the shunting element is connected across the second pair of output terminals. The shunting element is operable to regulate the output voltage or current waveform across the first pair of output terminals. A shunt control circuit is operable in combination with the shunting element to dissipate excess current in the power reception circuit.

In another embodiment of the present invention, the power reception circuit includes first and second shunting elements each having an input terminal operably coupled to an input power node. The first shunting element has an output terminal operably coupled to a load and is adapted to isolate the input power node from impedance variations of the load. The second shunting element is adapted to divert undesired current from the load.

In still another embodiment of the present invention, there is provided a portable data device (e.g., smart card) including an antenna element, an analog circuit and a power reception circuit. The antenna element is adapted to receive a modulated carrier signal at an input power node, the analog circuit is adapted to derive data from the modulated carrier signal, and the power reception circuit is adapted to derive power from the modulated carrier signal. The power reception circuit includes first and second shunting elements operable in combination to regulate a voltage level appearing at the input power node, the first shunting element regulating to a first voltage level and the second shunting element regulating to a second voltage level.

Figure 1:
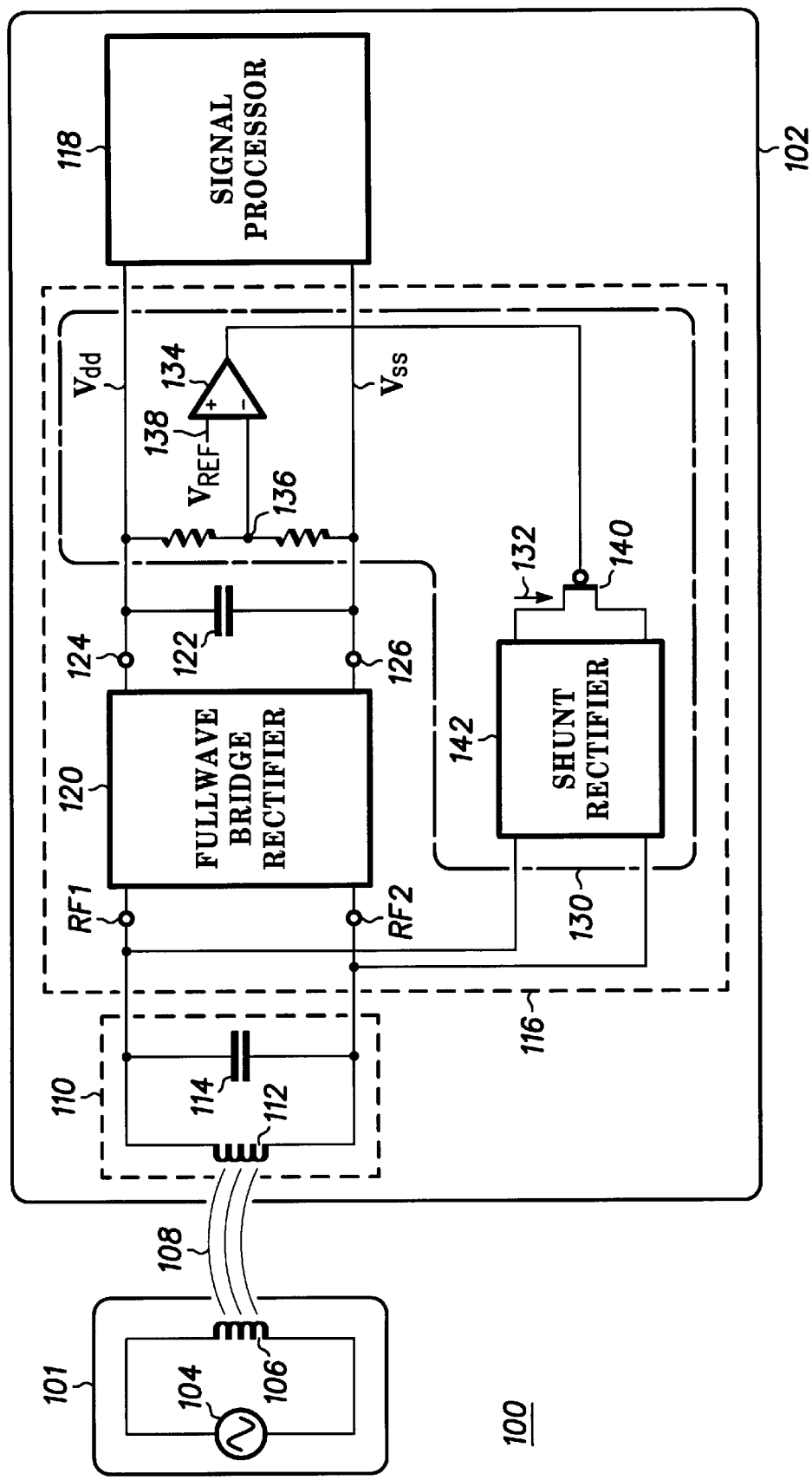
FIG. 1 is a block diagram of a contactless smart card system employing a power reception circuit in accordance with one embodiment of the present invention.

Turning now to the drawings and referring initially to FIG. 1, there is shown a contactless smart card system 100 embodying principles of the present invention. At a most basic level, the system 100 comprises a terminal device 101 operable to transmit a radio frequency (RF) power signal to a smart card 102. The terminal device 101 includes an RF source 104 and an antenna 106. The RF source 104 generates an electrical signal at a known carrier frequency that in a preferred embodiment is amplitude, phase or frequency modulated with information to be communicated to the smart card 102. For example, the signal in one embodiment is modulated with 10% amplitude shift keying (ASK) to communicate digital data to the smart card 102. It will be appreciated, however, that other modulation schemes may be used, or the carrier signal could be unmodulated if no information is to be communicated to the smart card 102.

The carrier signal excites the antenna 106, which then converts the signal to an RF electromagnetic field 108 radiating in the vicinity of the smart card 102. The smart card 102 includes an antenna resonance circuit 110 for coupling to the radiated RF electromagnetic field 108 and thereby receiving the RF carrier signal. In the illustrated embodiment, the antenna 106 of the terminal device 101 comprises an inductive coil, and the antenna resonance circuit 110 of the smart card 102 comprises an inductive loop of wire 112 and a tuning capacitor 114. However, it will be appreciated that other types of antennas and/or tuning elements may be used.

The smart card 102 includes a power reception circuit 116 for extracting power from the modulated RF carrier signal (hereinafter the input power signal), and further includes signal processing circuitry 118 (hereinafter "signal processor") for processing data derived from the input power signal. In one embodiment, the signal processor 118 is implemented with digital electronics embedded in an integrated circuit (IC) chip. However, it will be appreciated that other implementations might be used for the signal processor 118 including, for example, discrete components or analog circuitry. In one embodiment, the signal processor 118 requires a substantially constant (DC) voltage source for power. Thus, since the input power signal is a sinusoidal (AC) signal, the power reception circuit 116 must perform an AC-to-DC transformation of the input power signal.

In the embodiment of FIG. 1, the AC-to-DC transformation of the input power signal is accomplished by a full wave bridge rectifier 120 (hereinafter "power rectifier") and a power supply bypass capacitor 122. The power rectifier 120 conducts current from input terminals RF1, RF2 to its output (terminals 124, 126) when the magnitude of the voltage at the input is larger than the output by a predetermined threshold. The power rectifier 120 is not conductive for smaller magnitudes of input voltage. Generally, the power rectifier 120 produces a pulsating current that is integrated by the power supply bypass capacitor 122 to provide the charge required to power the components of the signal processor 118. The integration function provided by the power supply bypass capacitor 122 is designed to reduce the high frequency component of the input power signal, creating a substantially DC voltage across nodes 124, 126. The voltage at node 124 is designated as Vdd and the voltage at node 126 is designated Vss.

Figure 2:
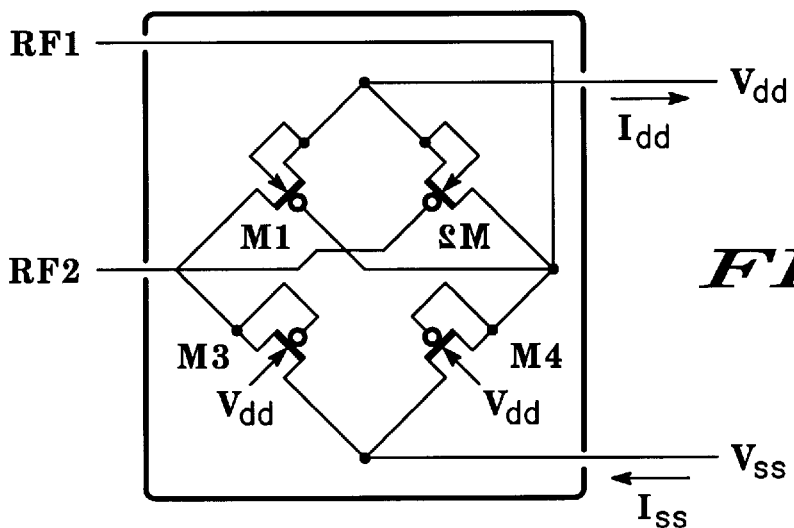
FIG. 2 is a circuit diagram of a power rectifier used in the power reception circuit of FIG. 1 in one embodiment of the present invention.

FIG. 2 shows a preferred embodiment of the power rectifier 120. The power rectifier 120 receives the AC input power signal across input terminals RF1 and RF2 and generates the substantially DC output voltage for the signal processor 118 across the nodes Vdd and Vss. The current flowing out of the node Vdd is denoted as Idd. The current flowing into the node Vss is denoted as Iss. Kirchoff's Current Law constrains the currents Idd and Iss to be equal if no other current path exists between the output nodes, Vdd and Vss, and the input node pair, RF1 and RF2. The current Idd must be sourced by transistor M1 or M2. The current Iss must be sunk by transistor M3 or M4. In a preferred embodiment transistors M1, M2, M3, and M4 are p-channel MOSFETs in an n-well CMOS process. If the voltage at RF2 is smaller than Vss by the threshold voltage of p-channel MOSFET M3, then a conduction path exists from Vss to RF2. If the voltage at RF1 is smaller than Vss by the threshold voltage of p-channel MOSFET M4, then a conduction path exists from Vss to RF1. No conduction path exists in the reverse direction. Since current can only flow from Vss into the bridge, Kirchoff's Current Law shows that current will only flow from the bridge into Vdd. If the voltage at RF2 is smaller than RF1 by the threshold voltage of p-channel MOSFET M2 and RF1 is greater than Vdd, then current will conduct from RF1 to Vdd. If the voltage at RF1 is smaller than RF2 by the threshold voltage of p-channel MOSFET M1 and RF2 is greater than Vdd, then current will conduct from RF2 to Vdd. In other words, current will flow into Vdd and out of Vss when |RF1−RF2|>Vdd-Vss-Vth where Vth is the threshold voltage of p-channel MOSFETs M3 or M4. The n-well bulk nodes for M1, M2, M3, and M4 are all connected to Vdd. Since by necessity the voltages at RF1 and RF2 will exceed the voltage at Vdd, care must be taken to minimize the amount of voltage across the source-bulk junction of transistors M1 and M2. Large device widths can minimize the source-bulk voltage drop, but some current will conduct across the pn-junction. Since all diffusions in a monolithic CMOS integrated circuit are parasitic bipolar transistors, the majority of the current that flows across this junction will flow to the collector of the parasitic bipolar. For an n-well CMOS process, the p-diffusion will be in an n-well and the collector will be the p-substrate which is connected to Vss.

Alternatively, the power rectifier 120 can be built using n-channel MOSFETs. The bulk node of these n-channel MOSFETs would be connected to Vss. Again, by necessity the voltages at RF1 and RF2 will exceed Vss. The current that flows across the source-bulk junction as the result of the forward bias will cause current flow into the collector of the parasitic bipolar transistor. For an n-type diffusion in a p-substrate the collector will be every n-diffusion on the CMOS integrated circuit. Since some or many of the n-type diffusions on the integrated circuit will be sensitive to this stray current, n-channel MOSFETs are less preferred than p-channel MOSFETs for the power rectifier 120.

In the contactless smart card operating environment, the power received by the card 102 may exceed the power required for the signal processor 118. Any excess power not dissipated by the signal processor 118 must be dissipated elsewhere in the card 102. The power received, and hence the total dissipation required by the card 102 is determined primarily by the distance and the relative orientation between the card 102 and the terminal antenna 106. The total power dissipation required of the card 102 can vary by more than an order of magnitude across the desired range of operation. Since power is the product of current and voltage, power dissipation can be increased by increasing either the supply voltage Vdd or the current drawn from that supply. Two factors constrain the requirements on the power supply voltage Vdd. It must meet or exceed a minimum voltage level required to power the components of the signal processor 118 and provide correct functionality, yet must not exceed a maximum voltage level that could cause physical damage or destruction to the components of the signal processor 118. Typically, the difference between these two constraints on the supply voltage Vdd is not large enough to accommodate the large variation in power that may be received by the smart card. In such case, it is desirable for smart card designers to keep the supply voltage Vdd substantially constant and adjust the current to accommodate the required power dissipation. This current is made up of two components. The first current component is the desired current, which includes current required to successfully operate the signal processor 118. Optionally, the desired current may include some current "delta" in excess of that needed to operate the signal processor, which current is nevertheless desired current. For example, it may be desirable to supply some amount of delta current to the signal processor 118 to facilitate isolation of switching noise from the modulated RF input signal. The second component of the current is the undesired current, or current that is not needed or desired for the signal processor 118. The smart card system of FIG. 1 employs a shunt regulator 130 for dissipating this undesired current through a shunt current path 132. The shunt regulator 130 comprises a difference amplifier 134, a resistor divider 136, a reference voltage input 138, a shunting element 140 and a dedicated shunt rectifier 142.

Figure 3:
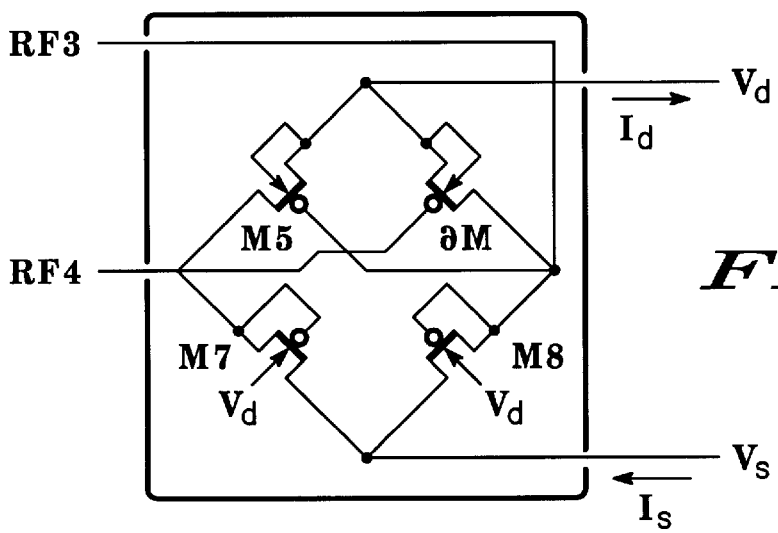
FIG. 3 is a circuit diagram of a shunt rectifier used in the power reception circuit of FIG. 1 in one embodiment of the present invention.

FIG. 3 shows a preferred embodiment of the shunt rectifier 142. In the illustrated embodiment, the shunt rectifier 142 includes four p-channel MOSFETs M5, M6, M7, and M8 in an n-well CMOS process. Alternatively, the shunt rectifier 142 can be built using n-channel MOSFETs. Much like the power rectifier 120 described in relation to FIG. 2, the shunt rectifier 142 converts the AC input power signal across input terminals RF3 and RF4 to a DC output voltage across the nodes Vd and Vs. However, the output of the shunt rectifier 142 represents excess power that is dissipated by the shunting element 140 through the shunt current path 132 and not used by the signal processor 118.

Now returning to FIG. 1, the shunting element 140 comprises a p-channel MOSFET having a gate coupled to the output of the difference amplifier 134. Alternatively, the shunting element 140 may comprise a resistor, bipolar transistor or virtually any other three terminal device. The difference amplifier 134 measures the difference between the voltage reference 138 and the voltage at the center tap of the resistor divider 136 and multiplies that difference by a large constant. Thus, relatively small changes in voltage at the input to the difference amplifier 134 can result in a large voltage at the output. If the voltage at the output of the difference amplifier 134 (and hence the voltage at the gate of the shunting element 140) is large, a small current will be diverted through the shunt path 132. Conversely, if the voltage at the output of the difference amplifier 134 is low, a large current will be diverted through the shunt path 132.

The shunting element 140 is coupled to the tuned RF input via the dedicated shunt rectifier 142. If the power supply voltage (node 124) is larger than desired, then the voltage appearing at the center tap of the resistor divider 136 (at the inverting input of the difference amplifier 134) will be larger than the reference voltage 138. This difference is gained up significantly and results in a reduced voltage at the output of the difference amplifier. The reduced voltage induces an increase in current through the p-channel MOSFET shunting element 140 and consequently increases the power dissipation in the shunting element 140. As will be appreciated, an increase in shunt power dissipation decreases the power available through the power rectifier 120, causing the power supply voltage (node 124) to decrease until the voltage at the center tap of the resistor divider 136 equals the reference voltage 138. Conversely, if the power supply voltage (node 124) is smaller than desired, then the reference voltage 138 (at the non-inverting input of the difference amplifier 134) is larger than the voltage appearing at the center tap of the resistor divider 136. This voltage difference is gained up significantly and results in an increased voltage at the output of the difference amplifier. The increased voltage induces a decrease in current through the p-channel MOSFET shunting element 140 and consequently decreases the power dissipation in the shunting element 140. Such decrease in shunt power dissipation increases the power available through the power rectifier 120, causing the power supply voltage (node 124) to increase until the voltage at the center tap of the resistor divider 136 again equals the reference voltage 138.

FIG. 4 is an exemplary prior art circuit useful for illustrating one of the advantages of the present invention. The circuit of FIG. 4 includes a power rectifier 420, power supply bypass capacitor 422 and shunt regulator 430 including a shunt device 440, difference amplifier 434, reference voltage 438 and resistor divider 436 and is adapted to supply a regulated voltage Vdd' and current Id' to an IC 418. As can be observed from FIG. 4, the shunt device 440 of the prior art is coupled across the power supply bypass capacitor 422. The power supply ripple seen between Vdd' and Vss' is a function of the value of the power supply bypass capacitor 422, the current load seen by the power supply, and the time between charging events. The power supply ripple can be expressed mathematically as $dV = I*dt/C$, where dt is equal to one half of the RF carrier period and is not adjustable.

Therefore, the power supply ripple is proportional to the load current and inversely proportional to the bypass capacitance. In the prior art circuit of FIG. 4, the load current on the power supply is equal to the sum of the desired current Id' and the shunt current diverted through the shunt path 432. Thus, both the desired current and the shunt current contribute to the power supply ripple. For large amounts of input power, the shunt current can be an order of magnitude larger than the desired current and cause a relatively severe power supply ripple problem.

Figure 5A:
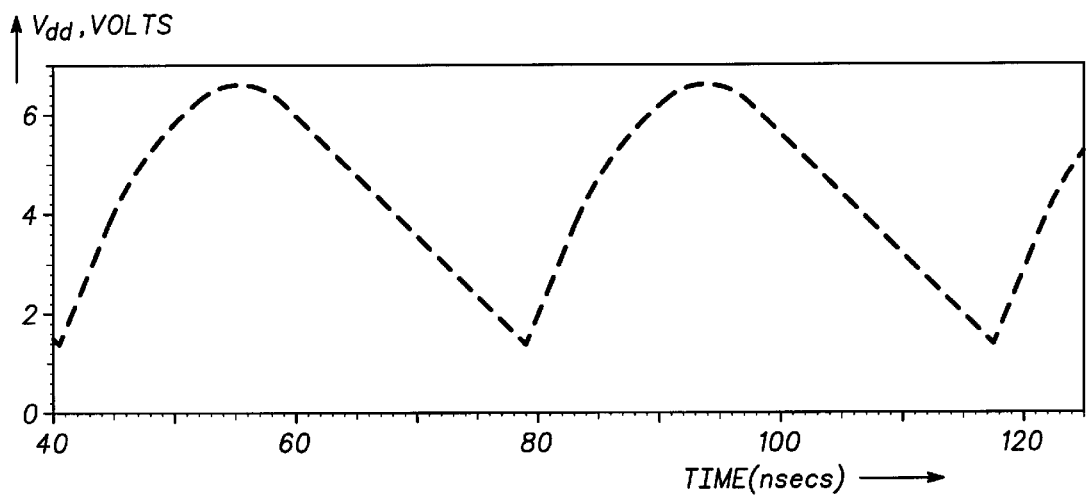
FIG. 5a is a graph showing a power supply ripple associated with the prior art power reception circuit of FIG. 4.

For example, assume the prior art circuit of FIG. 4 receives 200 mW of input power and is to deliver an operating voltage Vdd'=4 volts and a current Id'=8 mA. The power dissipated by the IC is 32 mW (4v×8 mA), thus the shunting element 440 must dissipate 168 mW of excess power. The current flowing through the shunt path 432 is then 42 mA (168 mW÷4v) and the total load current is 50 mA. For a power supply capacitor of 200 pF, the power supply ripple dv/dt will be 0.25v/nanosecond. As depicted in FIG. 5a, the power supply ripple associated with the prior art circuit of FIG. 4 is characterized by wide fluctuations of +/−2.3 volts about the desired supply voltage of 4 volts, from a minimum of 1.7 volts to a maximum of 6.3 volts. The power supply ripple may be expressed in terms of current as well as voltage waveforms, that is the output current waveform (not shown) associated with the prior art circuit of FIG. 4 will experience corresponding wide fluctuations as the output voltage waveform of FIG. 5a. The period of the power supply ripple waveform (e.g., about 40 nanoseconds in FIG. 5a) corresponds inversely to twice the power supply frequency (e.g., 13.56 MHz in FIG. 5a). As will be appreciated, power supply ripple waveforms of similar severity will result from the prior art circuit of FIG. 4 at different input power frequencies and for different desired supply voltages and currents.

Figure 5B:
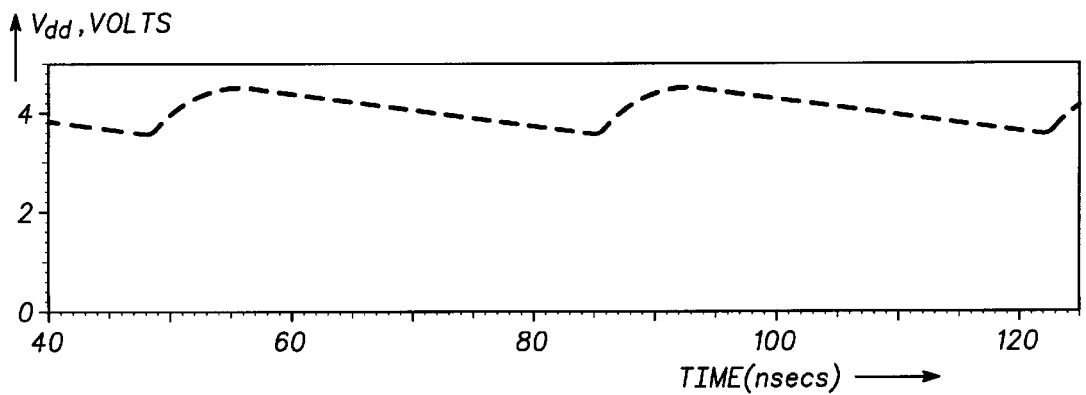
FIG. 5b is a graph showing a power supply ripple associated with power reception circuit of FIG. 1.

Advantageously, the power reception circuit 116 of the present invention allows for dissipating undesired current through the shunt path 132 without such undesired current contributing to power supply ripple. The desired current Idd, not the undesired current, contributes to the power supply ripple thus allowing for a much smoother output voltage (or current) waveform relative to the prior art. For example, assume the circuit of FIG. 1 receives 200 mW of input power and is to deliver an operating voltage Vdd=4 volts and a current Id=8 mA. The power dissipated by the signal processor is 32 mW (4v×8 mA), thus the shunting element 140 must dissipate 168 mW of excess power. The desired current flowing through the shunt path 432 is then 42 mA (168 mW÷4v). However, the load current is only 8 mA and thus, for the same size power supply bypass capacitor of 200 pF, the power supply ripple dv/dt will be only 0.04v/nanosecond. As depicted in FIG. 5b, such power supply ripple is characterized by narrow fluctuations of only +/−0.3 volts about the desired operating voltage of 4 volts, from a minimum of 3.7 volts to a maximum of 4.3 volts. The period of the power supply ripple waveform in FIG. 5b (e.g., about 40 nanoseconds ) is the same as that of FIG. 5a, thus indicating the same power supply frequency (e.g., 13.56 MHz) in each case. However, it will be appreciated that power supply ripple waveforms of similar smoothness will result from the circuit of FIG. 1 operating at different input power frequencies and for different desired supply voltages and currents.

A comparison of FIGS. 5a and 5b shows that the circuit of FIG. 1 experiences much less power supply ripple than the prior art circuit of FIG. 4 for the same input and output power levels, and for the same size power supply bypass capacitor (e.g., 200 pF). It is noted that the power supply ripple of either circuit can be reduced arbitrarily by increasing the value of the bypass capacitor. Thus, the prior art circuit of FIG. 4 could exhibit similar power supply ripple performance as the circuit of FIG. 1 if it used a bypass capacitor much larger (e.g., ten times larger) than that of FIG. 1. Thus, if the circuit of FIG. 1 has a 200 pF bypass capacitor, the prior art circuit of FIG. 4 would need a 2000 pF bypass capacitor to approach the power supply ripple performance of FIG. 1. However, the cost of implementing such a large capacitor would be prohibitive because large bypass capacitors require large amounts of silicon area, and the cost of an integrated circuit is a function of the silicon area. At any rate, even if such a capacitor could be economically manufactured and used in the prior art circuit of FIG. 4, that same capacitor if used in the system of FIG. 1 will produce a tenfold improvement in the power supply ripple shown in FIG. 5b.

Now turning to FIG. 6, there is shown a smart card 602 according to another embodiment of the present invention. The smart card 602 receives power from an impedance network 604, through a power rectifier 620 to an analog circuit 610 and signal processor 618. The impedance network 604 may comprise an inductive coil antenna and tuning capacitor receiving a modulated carrier signal, and the power rectifier 620 may comprise a full wave bridge rectifier as described in relation to FIG. 1. The signal processor 618 may comprise an integrated circuit with digital electronics embedded thereon, and the analog circuit may comprise a difference amplifier as described in relation to FIG. 1. More generally, the signal processor 618 represents generically any block that exhibits large dynamic impedance variations during normal operation. These variations might take the form of switching noise associated with digital circuits, discrete time analog blocks, or other analog circuits such as oscillators, comparators, or class-AB amplifiers. The analog circuit 610 likewise represents generically any circuit that is sensitive to voltage fluctuations resulting from the destructive types of impedance variations cited above.

In a preferred embodiment of the present invention, data is communicated from the terminal to the smart card by amplitude modulation (e.g., 10% ASK modulation) of the RF carrier. In such embodiment, the analog circuit 610 may comprise an ASK receiver used to recover data signals from the modulated carrier signal. The voltage supplied to the signal processor 618 comprises Vddd and Vss. The power rectifier 620 does not isolate the power supply, Vdd and Vss, from the antenna (represented in FIG. 6 by the impedance network 604). Thus, any noise (e.g., switching noise from the signal processor 618) coupled onto the power supply will appear across the impedance network 604. Generally, the ASK receiver (analog circuit 610) can not discriminate between amplitude noise and received data on the modulated carrier signal, thus any switching noise from the signal processor 618 will degrade the ability of the ASK receiver to recover data from the modulated carrier signal, thereby reducing the bit error rate performance of the receiver. To prevent noise from the signal processor 618 from appearing on the power supply, Vdd and Vss, thereby allowing for improved data recovery, the circuit of FIG. 6 includes a decoupling device 630 located on the ingress energy path to the signal processor 618.

In one embodiment, as will be described in greater detail in relation to FIG. 7, the decoupling device 630 defines a shunt regulator for nominally regulating the supply voltage. The circuit of FIG. 6 also includes a shunt device 640 for dissipating undesired current. In a preferred embodiment, the shunt device 640 comprises a p-channel MOSFET 642 having a gate coupled to the output of a difference amplifier defining a part of the analog circuit 610. Alternatively, the shunt device 640 may comprise a resistor, bipolar transistor or virtually any other three terminal device. In one embodiment, the shunt device 640 is coupled to a dedicated shunt rectifier 842 (see FIG. 8). As will be appreciated, however, the embodiment of FIG. 6 does not require a dedicated shunt rectifier. Yet another element in the circuit of FIG. 6 is an energy reservoir 644 at the output of the decoupling device 630 and disposed in parallel with the signal processor 618. In the illustrated embodiment, the energy reservoir 644 comprises a capacitive circuit 646. Also in parallel with the signal processor 618, a voltage regulator 650 is shown disposed between the ingress energy path and the egress energy path.

In accordance with one aspect of the present invention, the decoupling device 630 is operable to isolate the analog circuit 610 from the impedance variations of the signal processor 618. As a result, the impedance seen by the analog circuit 610 is determined by the decoupling device 630 and is independent of impedance variations of the signal processor 618. The voltage regulator 650 and energy reservoir 640 are used to maintain the voltage across signal processor within its required operating voltage range. In particular, the energy reservoir 640 functions to supply the instantaneous current required during each signal processor switching event, while the voltage regulator 650 functions to regulate the average voltage across signal processor.

Typically, the decoupling device 630 is used to maintain the impedance seen by analog circuit 610 at a substantially constant value. However, for other applications, the decoupling device 630 may be configured to allow this impedance to vary at a rate that does not substantially degrade the performance of the analog circuit 610. For example, in a smart card application, the impedance might be varied in a manner that is commensurate with the rate at which the card is passed through a card reader's magnetic field. As the card is moved closer to the reader, where the available input power is greater, the impedance would be reduced, enabling more power to be supplied to the signal processor 618. In this way, the maximum available input power could always be delivered to the signal processor 618. In one embodiment, where the input power signal comprises a modulated carrier signal, the impedance of the decoupling device 630 is varied at a rate that is substantially less than the input edge rate of the modulated data. Thus, any low frequency modulation distortion caused by varying the impedance of the device can be easily removed with a single pole high pass filter.

Figure 7:
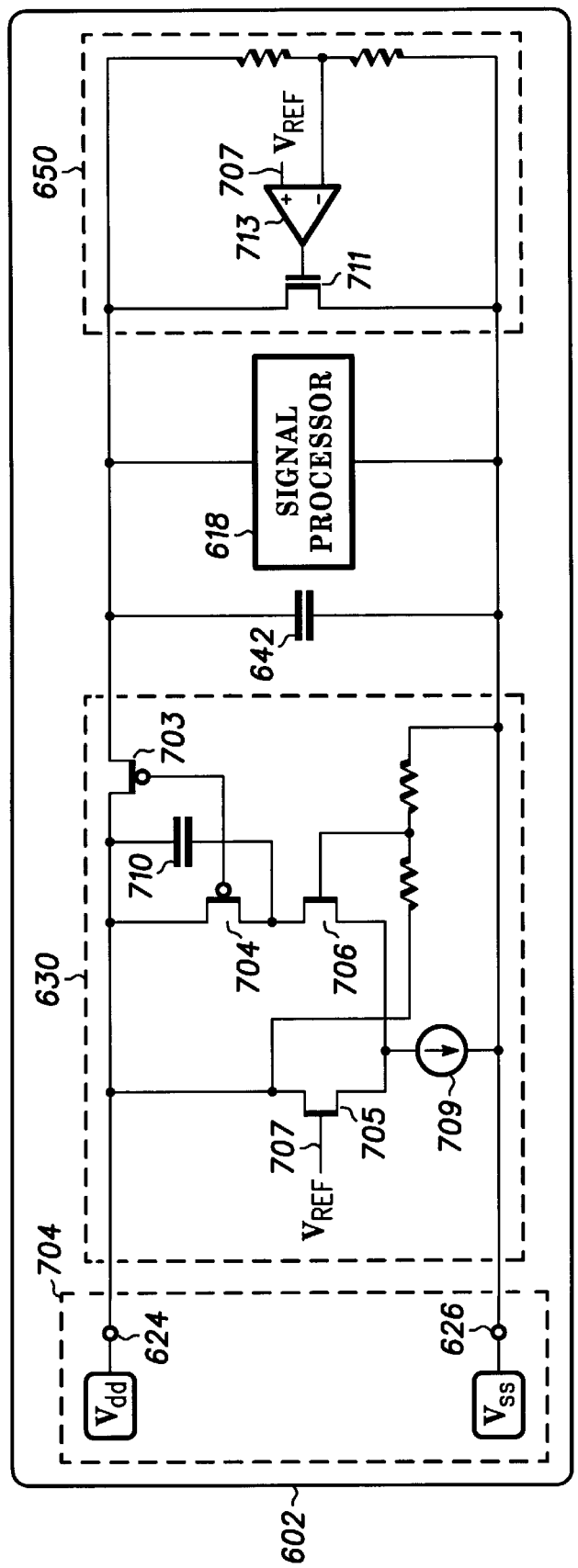
FIG. 7 is a circuit diagram showing a decoupling device associated with the embodiment of FIG. 6.

FIG. 7 shows a more detailed view of the decoupling device 630 and voltage regulator 650 of FIG. 6. The decoupling device 630 is comprised of p-channel MOSFETs 703 and 704, n-channel MOSFETs 705 and 706, and a constant current source 709. A fixed reference voltage (Vref) is applied to node 707. The supply voltage, Vdd and Vss, appears across nodes 624, 626, which may be defined as input power nodes supplying an electrical current to the decoupling device 630. Generally, the decoupling device 630 defines a shunting element in the circuit of FIG. 6, designed to isolate the input power nodes from impedance variations of the signal processor 618. However, it will be appreciated that the shunting element may be more narrowly defined as the PFET 703 (within the decoupling device 630).

The n-channel MOSFETs 705 and 706 constitute a differential pair for performing a current steering function, as is well known. The relative gate voltages of NFETs 705 and 706 determine how the current from the current source 709 splits between NFETs 705 and 706. The device with the larger gate voltage will have a larger source current. PFETs 703 and 704 comprise a current mirror circuit and, in a preferred embodiment, are sized such that the drain current in PFET 703 is approximately 100 times the drain current in PFET 704. The drain current for PFET 704 is substantially equal to the drain current of NFET 706, therefore the drain current in PFET 703 will be 100 times the drain current of NFET 706. The gate voltage of NFET 706 is a fixed fraction, X, of the supply voltage Vdd applied at node 706.

For X*Vdd significantly less than Vref, none of the current from current source 709 will flow in NFET 706 and consequently no current will flow through PFET 703. As the voltage X*Vdd is increased, some of the current from current source 709 will flow in NFET 706 and 100 times the current in NFET 706 will flow through PFET 703. When voltage X*Vdd equals Vref, the drain current of PFET 703 will be 50 times the current in current source 709. At this equilibrium point of the circuit, Vdd equals Vref/X. Thus, the decoupling device 630 defines a shunt regulator that nominally regulates the supply voltage to Vref/X. For X*Vdd significantly greater than Vref, all of the current from current source 709 will flow through NFET 706 and the current through PFET 703 will reach its maximum value of 100 times the current source current. This is the maximum decoupling current. The differential voltage applied to the differential pair devices 705 and 706 controls the drain current of PFET 703 substantially independent of voltage fluctuations that may occur due to the activity of the signal processor 618, as will be described.

Well known electronics principles suggest that the sum of the current flowing into capacitor 642, signal processor 618, and voltage regulator 650 must equal the current flowing out of PFET 703. Likewise, the respective currents flowing out of capacitor 642, signal processor 618 and voltage regulator 650 will be the same as the current flowing into those elements. As a result, the sum of the currents flowing out of capacitor 642, signal processor 618, and voltage regulator 650 is equal to the current flowing out of PFET 703 and therefore is independent of the activity of the signal processor 618. The capacitor 710 connected to the gate of PFET 703 and the transconductance of NFET 706 determines the bandwidth of the decoupling device 630, which in turn determines the rate at which the drain current of PFET 703 is varied. According to a preferred embodiment of the invention, this rate is substantially less than the input data edge rate of the ASK modulated input power source.

In the embodiment of FIG. 7, the voltage regulator 650 is an active shunt regulator comprising an operational amplifier 713 and shunt NFET 711. The high gain characteristic of the operational amplifier 713 and the negative feedback through the resistor divider forces the minus input of operational amplifier 713 to be equal to the Vref voltage 707. This fixes the supply voltage for the signal processor 618 to a desired level. Since the voltage regulator 650 can only sink current, it is necessary that the decoupling device 630 provide more current than required by the signal processor 618. Since the bandwidth of the operational amplifier 713 is finite, the capacitor 642 supplies high frequency current required by the signal processor 618 and prevents large, high frequency fluctuations in the supply voltage for the signal processor 618.

Figure 8:
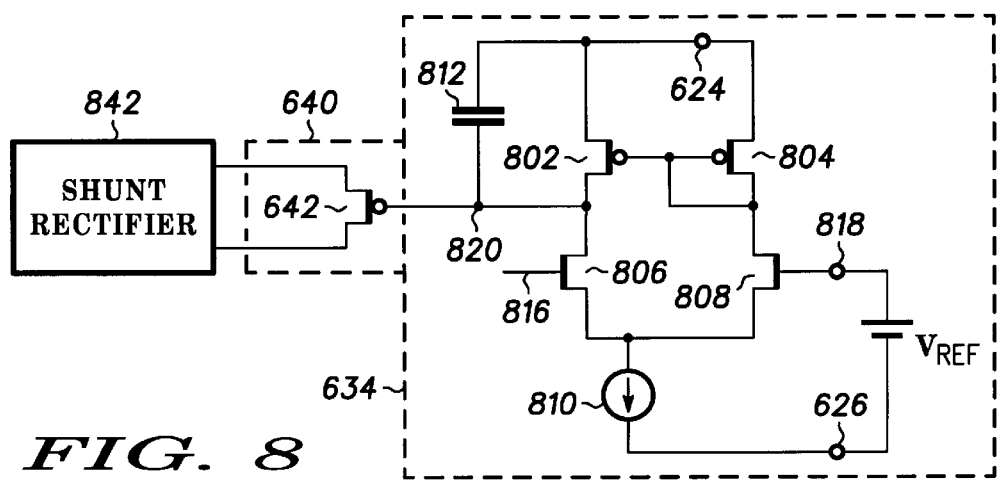
FIG. 8 is a circuit diagram showing a shunting device associated with the embodiment of FIG. 6.

FIG. 8 shows a more detailed view of the shunt device 640 (e.g., PFET 642) in combination with a difference amplifier 634 defining a part of the analog circuit 610. For convenience, the PFET 642 and difference amplifier 634 will hereinafter be referred to as "the shunt regulator circuit." Generally, the shunt device 640 (e.g., PFET 642) of the regulator circuit may be defined as a second shunting element in the circuit of FIG. 6, designed to divert undesired current from the signal processor 618. The difference amplifier 634 of the regulator circuit is comprised of p-channel MOSFETs 802 and 804, n-channel MOSFETs 806 and 808, and constant current source 810. N-channel MOSFETs 806 and 808 constitute a differential pair for performing a current steering function, as is well known. The relative gate voltages of NFETs 806 and 808 will determine how the current from current source splits between NFETs 806 and 808. The device with the larger gate voltage will have a larger source current. PFETs 802 and 804 comprise a current mirror circuit, which, in a preferred embodiment, are sized such that the drain current in PFET 802 is approximately equal to the drain current in PFET 804. The drain current for PFET 804 is substantially equal to the drain current of NFET 808, therefore PFET 802 will also be biased at a drain current which is substantially equal to the drain current of NFET 808. The drain currents of PFET 802 and NFET 806 sum at node 820. The difference between the two drain currents result in a very large voltage swing for small current differences. The Vref voltage applied to node 818 is a fixed quantity. The gate voltage of NFET 806 is a fixed fraction, Y, of the supply voltage Vdd applied at node 624. For Y*Vdd significantly less than Vref, none of the current from current source 810 will flow in NFET 806 and all of the current from current source 810 will flow through NFET 808. The current of NFET 808 is mirrored to PFET 802. Since the drain current of PFET 802 is larger than the drain current of NFET 806, the voltage at node 820 will go high. A high voltage at node 820 will turn off the shunt device PFET 642. For Y*Vdd greater than Vref, most of the current from current source 810 will flow in NFET 806 and less of the current from current source 810 will flow through NFET 808. The current of NFET 808 is mirrored to PFET 802. Since the drain current PFET 802 is smaller than the drain current of NFET 806, the voltage at node 820 will decrease. A reduced voltage at node 820 will increase the current of the shunt device PFET 642. For Y*Vdd equal to Vref, half of the current from current source 810 will flow in NFET 806 and half of the current from current source 810 will flow through NFET 808. The current of NFET 808 is mirrored to PFET 802. Since the drain current of PFET 802 is equal to the drain current of NFET 806, the voltage at node 820 will not change and neither will the current of the shunt device PFET 642. This equilibrium point is achieved when Vdd equals Vref/Y. Therefore the shunt device 640 regulates to Vref/Y.

Capacitor 812 sets the bandwidth of the shunt regulator circuit of FIG. 8. The bandwidth is substantially equal to the transconductance of NFET 806 divided by the value of capacitor 812. At frequencies greater than the bandwidth of the shunt regulator, capacitor 812 will fix the gate source voltage of the PFET shunt device. This prevents the shunt device 640 from removing signals on Vdd that exceed the bandwidth of the shunt regulator. The bandwidth of the shunt regulator circuit determines the rate at which the drain current of PFET 642 is varied. According to a preferred embodiment of the invention, this rate is substantially less than the input data edge rate of the ASK modulated input power source.

The decoupling device 630 (FIG. 7), shunt device 640 and difference amplifier 634 operate in concert to control the voltages seen by the signal processor 618. As noted previously, the signal processor 618 may comprise digital electronics embedded in an IC chip disposed on a smart card. The fractional divide ratio, X, used in the decoupling device 630 is larger than the fractional divide ratio, Y, used in the shunt regulator. Thus, the decoupling device 630 will regulate to a lower voltage than the shunt regulator. As power is provided to the smart card, voltage regulation will initially be accomplished by the decoupling device 630. The decoupling device 630 provides the required current to the signal processor 618. When the maximum decoupling current is reached, the shunt regulator provides the voltage regulation function and it dissipates the excess current. In a preferred embodiment, Vref is 2.25 volts, X is 9/16, and Y is 9/20. Therefore, in such embodiment, the decoupling device 630 nominally regulates the voltage to 4 volts and the shunt regulator regulates the voltage to 5 volts. In combination, the decoupling device 630 provides immunity to supply fluctuations resulting from digital switching noise, while the shunt regulator dissipates undesired current without increasing the power supply ripple.

In one embodiment, the decoupling device 630 and the shunt regulator are bandwidth limited to pass substantially a desired data portion of the modulated carrier signal and filter out frequencies that may result from card movement in the RF field. Generally, card movements induce modulation distortions in the signal at frequencies less than 1 kilohertz. Thus, in one embodiment, the bandwidth limited decoupling device 630 and the shunt regulator have a highpass characteristic removing frequencies less than about 1 kHz from the modulated carrier signal so that card movement in the field will not induce signal fluctuations that can be misinterpreted as data. The bandwidth is also set less than the frequencies that characterize the ASK signaling across the channel so that ASK signals will not be suppressed by the power supply regulation function of the present invention.

The present disclosure therefore has identified power reception circuits employable in a device such as a contactless smart card, which power reception circuits are operable to derive, from an input power signal (e.g., an ASK modulated RF carrier signal), an output power signal suitable for driving signal processing components of the device. The power reception circuits disclosed herein provide for only a limited degree of power supply ripple and prevent switching noise that otherwise would compromise the ability of the card to receive ASK modulated data from coupling to the modulated power signal. It will be appreciated, however, that the power reception circuits of the present invention are not limited to use in smart cards, or in devices receiving a modulated carrier signal, but rather may be employed in virtually any device receiving an AC input power signal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A power reception circuit comprising:
   a power rectifier operably coupled to an AC input power signal and including a first pair of output terminals, the power rectifier rectifying the input power signal, yielding a rectified output waveform across the first pair of output terminals;
   a shunt rectifier connected in parallel with the power rectifier and including a second pair of output terminals; and a shunting element connected across the second pair of output terminals.

2. The circuit of claim 1 wherein the shunting element is operable to regulate the output waveform across the first pair of output terminals.

3. The circuit of claim 2 further comprising a shunt control circuit operable in combination with the shunting element to dissipate undesired current in the power reception circuit.

4. The circuit of claim 1 further comprising a bypass capacitor connected across the first and second output terminals.

5. The circuit of claim 1 wherein the shunting element is a transistor.

6. The circuit of claim 5 wherein the shunting element is a FET.

7. The circuit of claim 1 implemented in a portable data device.

8. The circuit of claim 7 wherein the AC input power signal comprises a carrier signal inductively coupled to the portable data device.

9. The circuit of claim 1 wherein the AC input power signal is a modulated carrier signal, the circuit having a highpass characteristic for passing substantially a desired data portion of the modulated carrier signal.

10. The circuit of claim 9 wherein the highpass characteristic is adapted to remove low frequency modulation distortions from the modulated carrier signal.

11. The circuit of claim 10 being adapted to remove frequencies less than about 1 kHz from the modulated carrier signal.

12. A power reception circuit comprising:

a first and second shunting element each having an input terminal operably coupled to an input power node;

the first shunting element having an output terminal operably coupled to a load and being adapted to isolate the input power node from impedance variations of the load, the second shunting element being adapted to divert undesired current from the load.

13. The circuit of claim 12 wherein the load is voltage regulated.

14. The circuit of claim 12 wherein the input power node supplies a modulated carrier signal, the circuit having a highpass characteristic for passing substantially a desired data portion of the modulated carrier signal.

15. The circuit of claim 14 wherein the highpass characteristic is adapted to remove low frequency modulation distortions from the modulated carrier signal.

16. The circuit of claim 15 being adapted to remove frequencies less than about 1 kHz from the modulated carrier signal.

17. The circuit of claim 12 including a first rectifier connected between the input power node and the first shunting element.

18. The circuit of claim 17 including a second rectifier connected between the input power node and the second shunting element.

19. The circuit of claim 12 implemented in a portable data device.

20. A portable data device comprising:

an antenna element for receiving a modulated carrier signal at an input power node;

an analog circuit for deriving data from the modulated carrier signal; and a power reception circuit for deriving power from the modulated carrier signal, the power reception circuit including first and second shunting elements operable in combination to regulate a voltage level appearing at the input power node, the first shunting element regulating to a first voltage level and the second shunting element regulating to a second voltage level.

21. The circuit of claim 20 wherein the first voltage level is lower than the second voltage level.

* * * * *